United States Patent [19]

Schuh

[11] Patent Number: 4,834,622
[45] Date of Patent: May 30, 1989

[54] GAS TURBINE ENGINE/LOAD COMPRESSOR POWER PLANTS

[75] Inventor: Paul A. Schuh, San Diego, Calif.

[73] Assignee: Sundstrand Corporation, Rockford, Ill.

[21] Appl. No.: 917,554

[22] Filed: Oct. 10, 1986

Related U.S. Application Data

[62] Division of Ser. No. 504,441, Jun. 15, 1983, Pat. No. 4,627,234.

[51] Int. Cl.⁴ .............................................. F04D 27/02
[52] U.S. Cl. .................................... 419/307; 417/381; 415/27
[58] Field of Search ............ 60/39.141, 39.281, 39.29, 60/39.27; 415/27, 28, 11, 26; 417/307, 381

[56] References Cited

U.S. PATENT DOCUMENTS

| | | | |
|---|---|---|---|
| 2,948,114 | 8/1960 | Beslien et al. | 60/39.281 |
| 3,276,674 | 10/1966 | Hens | 415/28 |
| 3,550,133 | 7/1970 | Loft et al. | 60/39.281 |
| 4,044,554 | 8/1977 | West | 60/39.141 |
| 4,171,613 | 10/1979 | Schmidt-Roedenbeck | 60/39.281 |
| 4,350,008 | 9/1982 | Zickwolf | 60/39.281 |
| 4,380,893 | 4/1983 | Stokes et al. | 415/27 |
| 4,449,360 | 5/1984 | Evans | 60/39.281 |

Primary Examiner—Louis J. Casaregola
Attorney, Agent, or Firm—Harold A. Williamson

[57] ABSTRACT

Single shaft, air breathing auxiliary power units having a single stage centrifugal load compressor driven by a gas turbine engine. The latter has a single stage centrifugal compressor and a single stage radial inflow turbine mounted in back-to-back relationship on the same shaft as the load compressor. Control systems for these auxiliary power units feature turbine exhaust gas temperature and turbine speed responsive fuel flow control; a bypass valve control which causes air to be dumped overboard when the pneumatic load demand drops to prevent load compressor surge; and an inlet guide vane control.

11 Claims, 4 Drawing Sheets

GAS TURBINE ENGINE/LOAD COMPRESSOR POWER PLANTS

CROSS-REFERENCE TO RELATED APPLICATION

This application is a division of application Ser. No. 504,441 filed June 15, 1983, by Paul A. Schuh for GAS TURBINE ENGINE/LOAD COMPRESSOR POWER PLANTS (U.S. Pat. No. 4,627,234).

TECHNICAL FIELD OF THE INVENTION

The present invention relates primarily to auxiliary power units and, more particularly, to novel, improved, single shaft, air breathing auxiliary power units having a single stage centrifugal load compressor driven by a gas turbine engine, the latter including a single stage centrifugal compressor and a single stage radial inflow turbine mounted in back-to-back relationship on the same shaft as the load compressor.

The auxiliary power units disclosed herein are primarily intended for use on board military and commercial aircraft for main engine starting, to provide inflight engine restart assistance, and to supply power and compressed air for ground checkout and aircraft systems and/or environmental heating and cooling.

BACKGROUND OF THE INVENTION

One highly successful auxiliary power unit that has been used for the purposes just described is the Titan ® manufactured by Solar Turbines Incorporated, San Diego, Calif. That unit, which is produced in many models for military and civilian fixed wing aircraft and helicopters, is a radial engine of the single shaft, integral bleed type. Compressed air needed for main engine starting and other purposes is tapped from a station between the compressor and turbine of the engine.

Among the several advantages of this type of gas turbine engine are: simplicity of design resulting in exceptional durability and reliability, low weight, operational flexibility in a variety of mechanical and climatic environments, low maintenance costs, and good servicability.

SUMMARY OF THE INVENTION

The present invention, in contrast to the Titan ®, is an auxiliary power unit in which a load compressor driven by a power head (engine turbine and compressor) supplies the user demanded compressed air. Such units have the same advantages as those of the single shaft integral bleed type. They, however, have significantly higher pneumatic power-to-weight and power-to-volume ratios.

Auxiliary power units as disclosed herein are also superior to the heretofore available two-shaft gas turbine load compressor units. They have a smaller number of components which lowers costs and minimizes tolerance stack-up restraints. In addition, they also have higher power-to-weight and power-to-volume ratios.

Still another important attribute of the novel auxiliary power units disclosed herein is that they can be easily paralleled in applications where the demand exceeds the capacity of a single unit.

In addition, the auxiliary power units disclosed herein feature a novel pressure change rate sensing, feedback type dump or bypass valve control system which causes excess load compressor discharge air to be dumped overboard when the pneumatic load demand drops to prevent load compressor surge.

The control system also features two other novel control loops. One controls exhaust gas temperature by scheduling the flow of fuel to the engine as it is accelerated during start-up and controls turbine rotor speed after 100% of design speed is reached by varying the flow of fuel to the engine. The other controls the turbine exit temperature after design speed is reached by varying the positions of an annular array of load compressor inlet guide vanes incorporated in the unit. These vanes can, also, be closed when the unit is started to reduce air flow to the load compressor, thereby reducing acceleration drag on the power head of the unit and, consequentially, the power needed to start the engine.

PRIOR ART

Other single shaft radial gas turbine engine units with driven or load compressors have heretofore been proposed—see U.S. Pat. Nos. 2,578,481 issued Dec. 11, 1951, to Lombard; 2,850,876 issued Sept. 9, 1958, to Wood; and 3,965,673 issued June 29, 1976, to Frederick; Rodgers, The Performance of Single-Shaft Gas Turbine Load Compressor Auxiliary Power Units; Leach et al, Mechanical Reliability NAD/MCAIR F-18 APU Components Case History, 1983 Proceedings, Annual Reliability and Maintainability Symposium, pp. 37-42; and Stohlgren, The GTCP331, a 600 Hp Auxiliary Power Unit Program. However, there has not heretofore been developed or proposed an auxiliary power unit with the features of those novel units disclosed herein.

OBJECTS OF THE INVENTION

From the foregoing, it will be apparent to the reader that the primary object of the present invention resides in the provision of novel, improved auxiliary power units for rotary and fixed wing aircraft and other applications.

A related, also important and primary, object of the invention is to provide auxiliary power units as described in the preceding object which are capable of performing such functions as: delivering pneumatic power for A-C standby, A-C systems checkout, and main engine starting; assisting inflight main engine restarts; and supplying air for environmental heating and cooling purposes.

Other more specific but nevertheless important objects of the invention reside in the provision of auxiliary power units in accord with the preceding object:

which have exceptional durability and reliability;
which have low weight;
which have a high degree of operational flexibility in a wide range of mechanical and climatic environments;
which provide good servicability and are relatively inexpensive to maintain;
which have high power-to-weight and power-to-volume ratios;
which have a relatively small number of components, making them less expensive than many heretofore available units, and, also, less subject to stack-up restraints;
which can be easily paralleled in applications where the load or demand exceeds the capacity of a single unit;
which have a novel control system for: preventing load compressor surge, scheduling the flow of fuel to the engine, and regulating the turbine exhaust gas temperature.

Other important objects and features and additional advantages of the invention will be apparent from the appended claims and as the ensuing detailed description and discussion proceeds in conjunction with the accompanying drawing.

DETAILED DESCRIPTION OF THE INVENTION

Referring now to the drawing, FIGS. 1-4 depict an auxiliary power unit 10 constructed in accord with and embodying the principles of the present invention.

The major components of the auxiliary power unit include a power head 12, a load compressor 14, a reduction/accessory drive unit 16 which provides power to a fuel control pump pad and a lube oil pump (neither shown), and a casing or housing 18.

Figure 4:
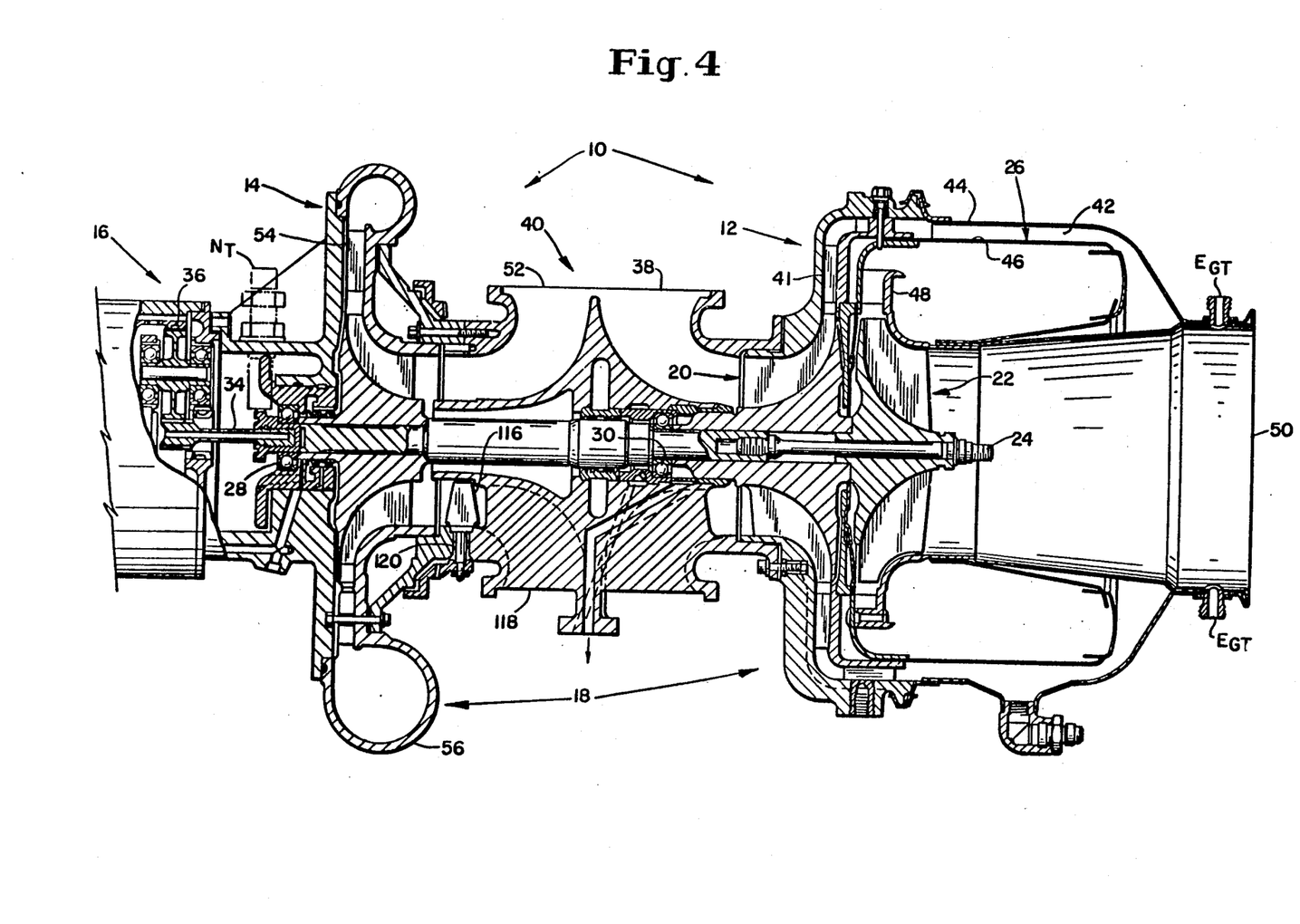
FIG. 4 is a vertical section through the auxiliary power unit.

The major components of power head 12 include an over-hung single shaft centrifugal compressor 20 and a single stage radial inflow turbine 22 mounted in back-to-back relationship on a single shaft 24 and an annular combustor 26. Shaft 24 is rotatably supported in casing 18 by preloaded, annular contact bearings 28 and 30 which are located toward the cooler end of the engine and are lubricated by a direct oil spray.

Single stage centrifugal load compressor 14 is mounted on the end of shaft 24 opposite compressor 20 and turbine 22. Shaft 24 is connected by a spline 34 to the input of reduction/accessory drive 16 which is a star gear 36. The reduction/accessory drive will not be described further herein as it is not part of the present invention.

Both compressor rotors are machined from titanium alloy (Ti-6Al-4V) forgings, and the turbine is a one-piece INCO 713 casting. The use of titanium compressor rotors minimizes starting energy and results in excellent cool-day and high-altitude start characteristics. The power head compressor has backwardly curved blades which gives it high efficiency over a broad flow range.

One auxiliary power unit of the character just described weighs only 152 pounds. At the design speed of 64,643 rpm, it is capable of generating 300 hp at a fuel consumption of 117 kg/hr and of delivering 1.13 kg/sec of compressed air at a pressure of 4.02 atmospheres.

Referring again to the drawing, air enters the housing 18 of auxiliary power unit 10 through the power head side 38 of inlet 40 and flows to power head compressor 20. The compressed air is discharged into radial diffuser vanes 41, then turned axially and discharged into the annular plenum 42 surrounding combustor 26. This annulus of relatively cool air surrounding combustor 26 keeps the exterior skin 44 of power head 12 relatively cool (in one case 450° F. as compared to the 1200° F. temperature of the combustor liner).

The compressed air flows from annular plenum 42 through holes and slots (not shown) in combustor liner 46 into combustor 26 where fuel is added to the air and burned.

The hot gases generated in this combustion process flow axially to turbine nozzles 48, expand through the nozzles, and are discharged into turbine 22 to drive the latter. Hot gases discharged from turbine 22 are exhausted from power head 12 through diffuser 50.

As it is mounted on the same shaft 24, load compressor 14 rotates with turbine 22. Air introduced through the load compressor side 52 of inlet 40 is compressed by the load compressor. The compressed air flows through diffuser vanes 54 and then into a discharge plenum or scroll 56.

As shown in FIGS. 1-3 and 5, the compressed air is discharged from scroll 56 into a duct 58. From there, the compressed air flows through a duct 60 equipped with a demand responsive valve 62 to the locus of use.

The power head 12 of the particular auxiliary power unit 10 illustrated in FIGS. 1-4 has six air atomizing fuel nozzles (not shown) located in the primary zone of combustor liner 46. Fuel is injected into the throats of those nozzles, atomized, and then delivered into a primary combustion zone in combustor 26.

The fuel nozzles are skewed so that the swirling flows of atomized fuel discharged from them will overlap in the primary combustion zone of combustor 26, promoting rapid flame propagation on ignition and uniform burning.

Additional air is mixed with the hot combustion products by way of slots in the combustor liner, and sufficient length is provided to permit thorough mixing so that the temperature of the hot gases entering the turbine will be uniform.

Figure 6:
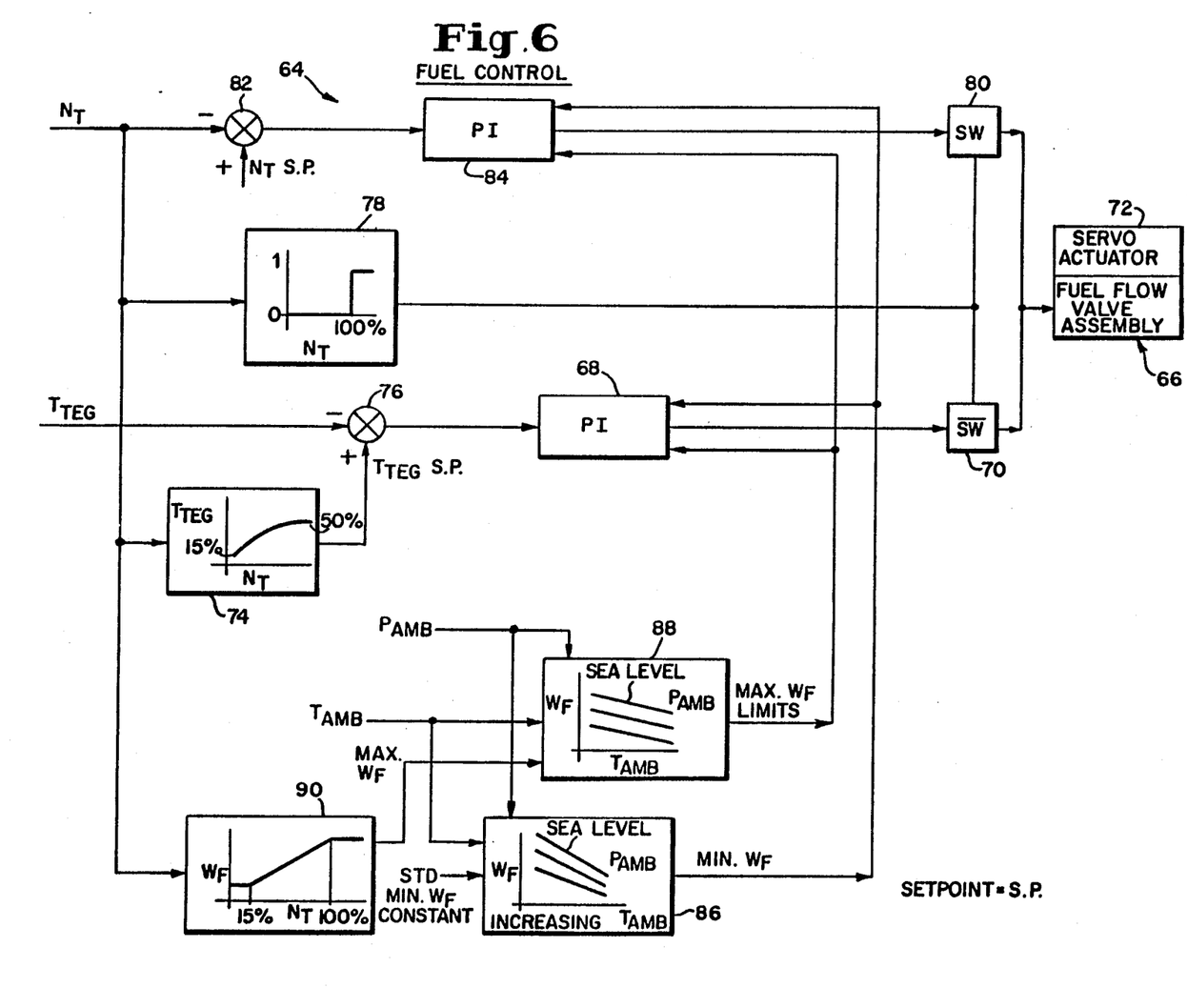
FIG. 6 is a block diagram of a fuel flow control for the auxiliary power unit of FIG. 1.

The flow of fuel to the fuel injection nozzles of combustor 26 is regulated by a novel fuel control system illustrated diagrammatically in FIG. 6 and identified by reference character 64. That system controls the servo actuator of the modulating type fuel flow valve 66 to regulate the rate $W_F$ at which the fuel flows through valve 66 to the combustor 26 of auxiliary power unit 10.

Fuel control system 64 is of the closed-loop type. During acceleration from start (i.e., zero rpm to, typically, 100% of design speed), control system 64 so schedules the flow of fuel to combustor 26 as to keep the power head turbine exhaust gas temperature from exceeding specified maximum limits. When the selected speed is reached, the control over fuel scheduling is handed off to a closed loop which so schedules the flow of fuel as to keep the turbine rotating at a specified speed.

Fuel flow control system 64 also has the capability of leaning and enriching the open loop fuel schedule as functions of both ambient pressure (i.e., altitude) and the ambient or compressor inlet air temperature. On a cold day, additional fuel is scheduled to the combustor whereas at higher altitudes, and on hotter days, the fuel schedule is decreased. It also keeps the fuel flow above a level at which flameout might occur.

The limitation on maximum fuel flow also helps to limit engine runaway and "overshoots" during transient load conditions.

Another important feature of fuel control system 64 is a speed responsive back-up control which functions during the acceleration part of the fuel schedule. This back-up control limits the fuel that can be made available to combustor 26, keeping the engine from running away if the turbine exhaust gas temperature-based control is lost for some reason.

Figures 1, 2, 3, 5:
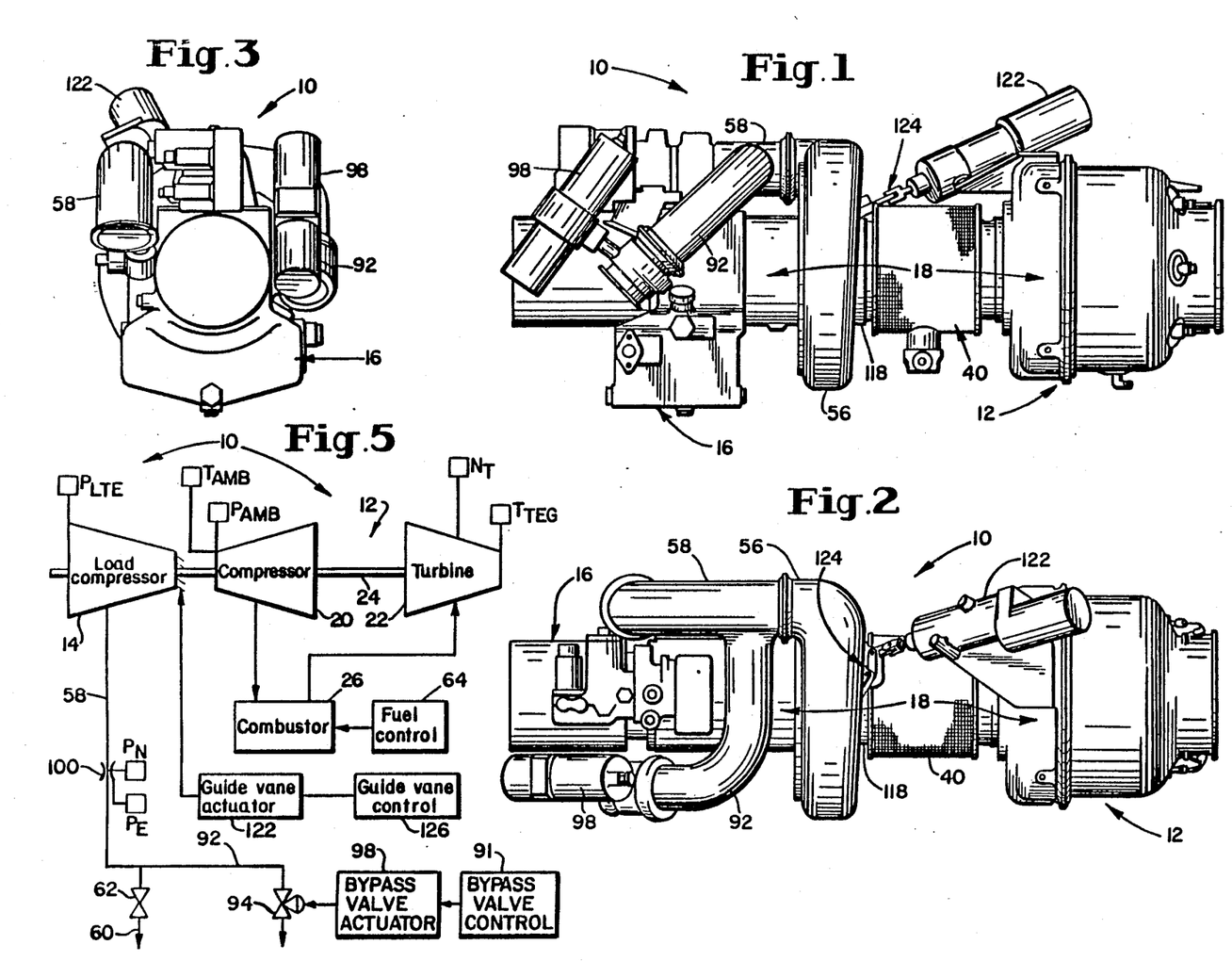
FIG. 1 is a side view of an auxiliary power unit constructed in accord with and embodying the principles of the present invention.
FIG. 2 is a top view of the auxiliary power unit shown in FIG. 1.
FIG. 3 is an end view of the auxiliary power unit.
FIG. 5 is a schematic view of the auxiliary power unit and certain associated ducting.

Referring now to FIGS. 4–6, sensors $T_{TEG}$, $N_T$, $T_{AMB}$, and $P_{AMB}$ are employed to measure the temperature of the gas exhausted from turbine 22, the speed of that turbine, and the temperature and pressure of the air introduced into the compressor 20 of auxiliary power unit 10 through inlet 40.

In the acceleration portion of the fuel flow schedule, the exhaust gas temperature is employed in a closed loop control to regulate the flow of fuel to combustor 26 through fuel flow valve 66. Specifically, the exhaust gas temperature signal originating from sensor $T_{TEG}$ is transmitted to a conventional PI controller 68 where it is processed into a fuel flow control signal in a manner familiar to those skilled in the controls field. The output of the controller is connected through a gating device 70 to the servo actuator 72 of fuel flow valve 66.

To prevent "overshoots" in the flow of fuel supplied to combustor 26 during the start acceleration of gas turbine engine 12, a turbine speed responsive system limiting the flow of fuel to combustor 26 is incorporated in fuel control 64. The flow limiting system includes a function generator 74 with an input which is a signal originating at sensor $N_T$ and having a magnitude proportional to the speed of the power head turbine 22. Function generator 74 converts this input to an exhaust gas temperature proportional output by performing the calculation shown graphically in FIG. 6. This calculated exhaust gas temperature signal—which is in effect a $T_{TEG}$ setpoint increasing in the turbine speed range of 15 to 50 percent of design speed—is summed with the measured exhaust gas temperature signal in adder 76.

As suggested above, this novel arrangement alleviates overshoots in the amount of fuel supplied to combustor 26 during the acceleration schedule.

When turbine 22 reaches a selected speed (typically 100% of design speed), function generator 78, which also has turbine speed as an input, generates an output or control signal which is transmitted to gating devices 70 and 80. This signal causes gating device 70 to become inactive and gating device 80 to become active.

As a result, control over the flow of fuel to combustor 26 is thereafter exercised as a function of the speed of turbine 22 ($N_T$). The speed indicative signal originating via sensor $N_T$ is transmitted to an adder 82 where that signal representative of measured speed is summed with a speed setpoint signal. The resulting error signal is transmitted to PI controller 84 and processed. The PI controller output is transmitted through gating device 80 to the actuator 72 of fuel flow control valve 66 to open and close the latter and increase and decrease the flow of fuel to combustor 26 as needed to keep turbine 22 running at a constant (or programmed) speed.

In addition to the foregoing, the novel fuel flow control system 64 illustrated in FIG. 6 includes logic or circuitry for changing the nominal (standard day) rate-of-flow of fuel to combustor 26 as to compensate for changes in ambient temperature and pressure (i.e., altitude). Also, a back-up system is provided to independently limit the flow of fuel to combustor 26 and thereby limit engine runaway if the exhaust gas temperature responsive system discussed above fails.

In particular, fuel control system 64 is designed to limit the excursion of fuel flow control valve 66 and, therefore, the maximum and minimum limits on the flow of fuel to combustor 26 as a function of both ambient temperature and ambient pressure or altitude. This keeps the flow of fuel to the combustor at a sufficiently high level to prevent flameout but at a sufficiently low level to limit engine runaways and overshoots if the fuel control system fails.

Minimum flow is established by a function generator 86 having ambient temperature and ambient pressure inputs. The function generator converts these inputs into a fuel flow representing output by performing the calculations shown graphically in FIG. 6. The output of function generator 86 is transmitted to the PI controller 68 which schedules the flow of fuel to combustor 26 during the acceleration schedule and to the PI controller 84 which schedules the fuel flow when 100% design or other selected speed is reached. This establishes a floor on the level to which the output of the active controller can decrease and, consequently, on the extent to which fuel flow valve 64 can close, thereby limiting the minimum flow of fuel through the valve to a rate dictated by ambient temperature and pressure.

The maximum fuel flow limit is similarly increased on cold days and at lower altitudes and decreased on warmer days and higher altitudes by a function generator 88 which also has ambient temperature and pressure inputs and is capable of generating a fuel flow signal from those inputs by performing the graphically presented calculations. The output from function generator 88 is also transmitted to PI controllers 68 and 84 to ultimately control the extent to which valve 66 can open and, consequently, the maximum flow of fuel to combustor 26.

Engine runaways due to failure of the exhaust gas temperature responsive system are prevented by the inclusion of function generator 90 in the fuel control system. The input to function generator 90 is the power head turbine speed furnished from sensor $N_T$. As shown in FIG. 6, this function generator allows the maximum flow of fuel to combustor 26 to increase during the acceleration part of the fuel flow schedule beginning at the speed (typically 15% of design) at which the main fuel supply to combustor 26 is activated but puts a ceiling on the fuel flow level once the 100% design speed or other selected operating speed is reached. Looked at from another perspective, the output from function generator 90 shifts the family of $P_{AMB}$ curves (function generators 86 and 88) upwardly as gas turbine engine 12 accelerates to raise the limit on the maximum amount of fuel that can be supplied to combustor 26.

The output from function generator 90 is transmitted to PI controllers 68 and 84 through function generator 88 to set limits of the output from the back-up system for ambient temperature and altitude.

Figures 7, 8:
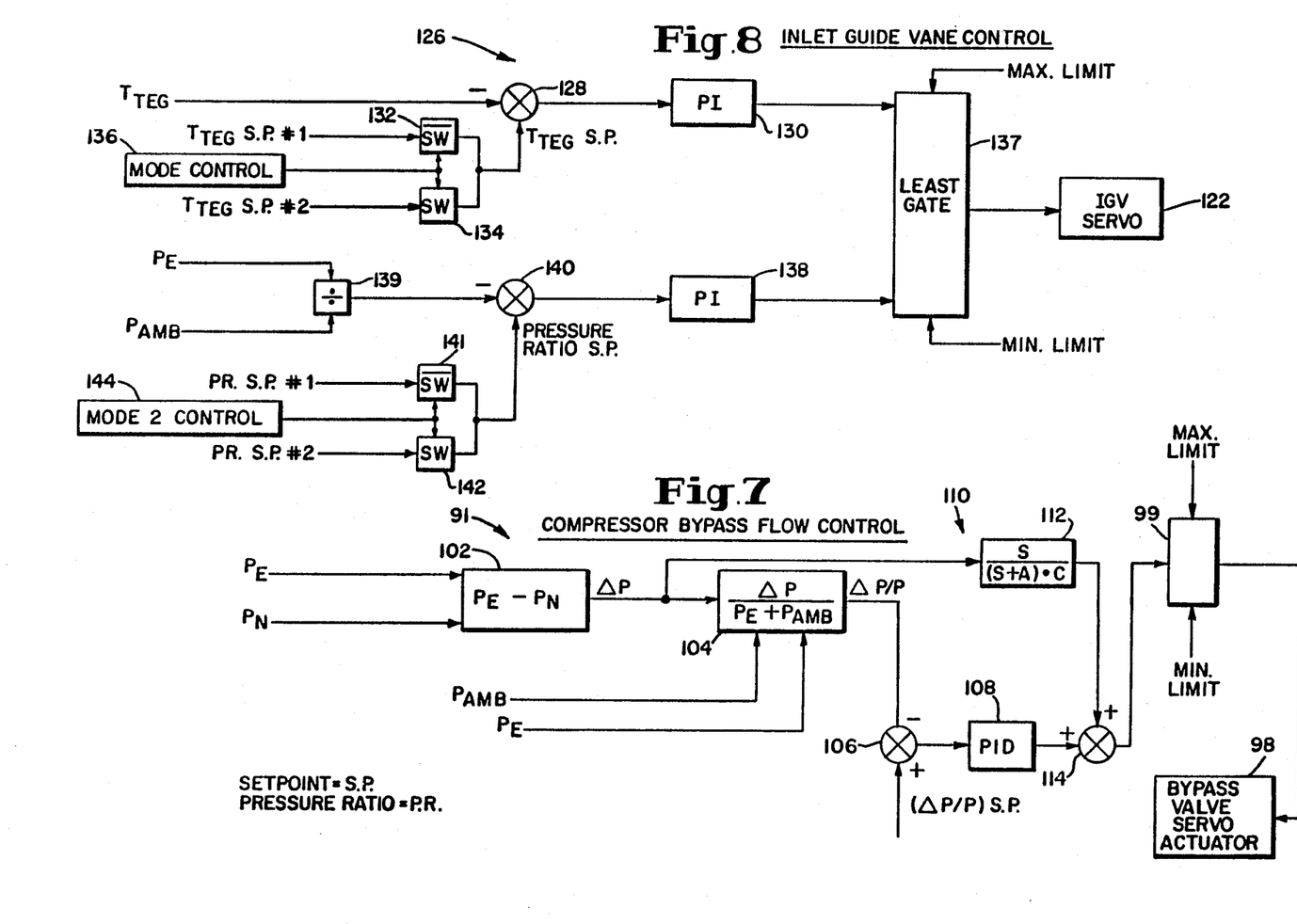
FIG. 7 is a block diagram of a surge prevention control for the auxiliary power unit of FIG. 1.
FIG. 8 is a block diagram of an inlet guide vane control for the auxiliary power unit of FIG. 1.

Referring now to FIG. 7, the second of the novel control systems incorporated in auxiliary power unit 10 (and identified by reference character 91) is also of the closed-loop type and is used to prevent load compressor surge.

The demand for compressed air or pneumatic power can vary widely in applications of the type to which auxiliary power units such as those disclosed herein are typically put. Absent some provision for preventing it, compressor discharge air could flow from duct 60 to duct 58 and backwards through load compressor 14 if the demand dropped rapidly enough. This can occur with enough violence to seriously damage the compressor.

In auxiliary power unit 10, surge is prevented in such circumstances by dumping excess air through a bypass duct 92 equipped with a load compressor bypass value 94 having a pneumatically operated servo actuator 98.

As is also shown in FIG. 5, a nozzle 100 is located in compressor discharge duct 58 on the downstream side of load compressor 14. The pressure at the throat of this nozzle ($P_N$) and the total pressure at the nozzle exit ($P_E$) are measured and transmitted to a function generator 102 in bypass valve control system 91 which solves the equation $P_E - P_N$, generating a $\Delta P$ output. This output is in turn transmitted to a function generator 104 which solves the algorithm $$\frac{\Delta P}{P_E + P_{AMB}},$$

where $P_{AMB}$ is the ambient pressure or altitude. The output from function generator 104, therefore, has the form $\Delta P/P$ (this is a unique value because of the absolute pressure in the denominator of the algorithm). By keeping the $\Delta P/P$ value above a selected level, conditions which might result in engine surge can be avoided.

In the system 91 shown in FIG. 7, this is accomplished by summing the measured $\Delta P/P$ value and a $\Delta P/P$ setpoint value in an adder 106 (typically, the control will be made so the setpoint can be adjusted to accommodate a variable load compressor and/or to obtain the most efficient auxiliary power unit operation as a function of guide vane position).

The adder output is transmitted to a PID controller 108, the output from the latter then being employed to operate the servo actuator 98 of bypass valve 94 and open the latter when the demand on load compressor 14 decreases. Limiter 99 restricts the extent to which valve 94 can be opened to accommodate decreasing demand on the load compressor and the extent to which it can subsequently be closed when the demand subsequently increases.

Other strategies for controlling bypass valves to prevent compressor surge have been proposed. The novel approach just described, however, has the advantage that, with only a small sacrifice in accuracy, it provides increased reliability by protecting pressure sensors $P_N$ and $P_E$ against damage resulting from the pressure reversals that can occur when the customer demand drops to an extent causing rapid unloading of the load compressor.

Bypass valve control 91, as thus far described, has a relatively slow response rate.

To ensure that this does not result in the generation of surge conditions before bypass valve 94 can be opened, a more rapidly responding control loop 110 is paralleled with that loop of bypass flow control system 91 just discussed. In the more rapidly responding loop 110, the $\Delta P$ input is transmitted to a function generator 112 where it is processed into a dynamically compensated (lead) control signal. This $\Delta P$ input to the function generator collapses much more rapidly with decreases in the demand on load compressor 14 than the $\Delta P/P$ value does. Therefore, function generator 112 generates a signal which anticipates the closing of demand responsive valve 62, thereby ensuring that bypass valve 94 will open to the extent necessary to prevent surge before that condition can occur.

The transfer function for the algorithm solved in function generator 112 is shown in FIG. 7. The transfer function is a pure operator of conventional character (lead with first order lag). The transfer function may be changed from application-to-application depending upon, for example, the particular valves that are employed and the speed with which they can be adjusted.

The output from function output generator 112 is summed with the output from PID controller 108 in adder 114.

As this output will, initially upon the closing of demand responsive valve 62, be much larger than the output from PID controller 108, the function generator 112 output will predominate and effect the initial, rapid opening of bypass valve 94. Thereafter, that output signal will decay; and the output from PID controller 108 will assume the primary controlling function to adjust the bypass valve to an appropriate final position.

Referring again to FIGS. 1, 2, and 4, variable inlet guide vanes 116 are rotatably supported in that section 118 of casing 18 housing load compressor 14 on the upstream side of the load compressor at equiangularly spaced locations therearound.

These vanes are rotated in bushings 120 by a pneumatically operated servo actuator 122 to which they are connected by a linkage identified generally by reference 124 in FIGS. 2 and 3. The guide vanes, their mountings, and the guide vane actuating linkage are all of essentially conventional construction. For this reason and because the details of the foregoing components are not necessary to an understanding of the present invention, they will not be described herein.

Guide vanes 116 are closed to minimize the flow of air through load compressor 14 when gas turbine engine 12 is started. This reduces the load upon the engine and, therefore, the power required to start it.

The guide vanes are then opened as turbine 22 comes up to speed. Thereafter, the inlet guide vanes are adjusted to keep the pressure ratio across load compressor 14 and the temperature of the gas exhausted from turbine 22 from exceeding specified levels.

Both of the foregoing modes of exercising control are employed because of the range of operating conditions which the auxiliary power unit may encounter.

For example, as the demand upon the load compressor increases, the turbine exhaust temperature rises as power head 12 seeks to deliver the power to the load compressor needed to meet the demand. If this results in the exhaust gas temperature approaching the specified limit, the inlet guide vanes will be moved toward the closed position, cutting down the flow of air through the load compressor and, as a consequence, the load which that compressor is capable of placing on the power head.

The pressure ratio mode of control, on the other hand, limits the power which the load compressor can absorb from the power head, especially at lower ambient temperatures as the power which the load compressor can absorb increases as the ambient temperature drops. This is important as one example in that it keeps the load compressor from raising the working pressure in the load compressor discharge duct to a level that may be unacceptable downstream from the load compressor.

The novel closed loop system for controlling the operation of guide vane actuator 122 to rotate and thereby open and close guide vanes 116 to respectively increase and decrease the flow of air through load compressor 14 is illustrated in FIG. 8 and identified by reference character 126.

In guide vane control 126, an input indicative of turbine exhaust gas temperature is transmitted to an adder 128. Here, the measured input is summed with an exhaust gas temperature setpoint value to produce an input or correction signal for PI controller 130.

It may be desirable to vary the setpoint just discussed. To provide this flexibility, gating devices 132 and 134 through which different setpoint values can be transmitted to adder 128 are employed. A mode control 136 which may be manual, programmed, etc. is employed to make the gating device corresponding to the desired setpoint value active.

The output from PI controller 130 is transferred to a least gate 137 as is the output from a second PI controller 138.

The input to the latter is a function of the pressure across load compressor 14. Specifically, a signal indicative of the load compressor exit pressure ($P_E$) is divided by one representative of the ambient pressure at load compressor inlet 40 in a conventional divider 139. The output from the latter is transmitted to an adder 140 where the calculated pressure ratio is summed with an input corresponding to a pressure ratio setpoint. The output from adder 140 is transmitted to the PI controller, and the output from the latter is also transmitted to least gate 137 as indicated above.

The least gate allows the lower value control signal to be transmitted to the inlet guide vane actuator 122. It also controls the magnitude of this signal and, therefore, the excursion of the guide vanes. This ensures that the signal controlling the positioning of inlet guide vanes 116 will be one which will keep both the pressure ratio across load compressor 14 and the temperature of the gas exhausted from power head turbine 22 within safe limits.

As in the case of the exhaust gas temperature input, it may prove desirable to vary the pressure ratio setpoint. Gates 141 and 142 for transmitting different setpoint values to adder 140 and a mode control 144 for activating the gate corresponding to the selected setpoint value are provided for this purpose.

The controllers and function generators of the novel fuel scheduling, inlet guide vane positioning, and surge protection control systems described above and illustrated in FIGS. 5-7 can be of the digital type or analog type. Consequently, the term "signal" is intended to encompass the inputs to and outputs from digital devices as well as analog device-associated signals.

It will be apparent to those skilled in the relevant arts from this specification that the novel devices disclosed herein can be used for purposes other than as onboard auxiliary power units for rotary and fixed wing aircraft. For example, they may be used in ground cart applications to provide ground power and environmental support. Therefore, the term "auxiliary power unit" as employed herein is to be understood as being employed as one of convenience; it is not intended to restrict the scope of the invention as defined in the appended claims.

It will also be apparent to the reader that the invention may be embodied in specific forms other than those disclosed above without departing from the spirit or essential characteristics of the invention. The embodiments of the invention disclosed above are therefore to be considered in all respects as illustrative and not restrictive. The scope of the invention is instead indicated by the appended claims, and all changes which come within the meaning and range of equivalency of the claims are intended to be embraced therein.

What is claimed and desired to be secured by Letters Patent of the United States is:

1. A single shaft gas turbine engine power plant comprising: a power head; a load compressor driven by said power head; delivery duct means for air discharged from said load compressor; a bypass duct means connected in parallel with said delivery duct means; and a modulating valve in said bypass duct means; said power head being an air breathing gas turbine engine comprising a radial compressor; a combustor for heating, and thereby adding energy to, the air discharged from the engine compressor; and a radial gas turbine driven by hot gases flowing thereto from said combustor and drive-connected of said engine and load compressors; and said power plant also having control means for preventing surge in said load compressor which comprises a nozzle in said delivery duct means, means for producing a signal indicative of the difference between the pressures at the throat and exit of said nozzle, means for converting said pressure difference signal to a surge protection signal, means for generating an error signal by comparing said surge protection signal with a surge protection setpoint signal, and a controller which has said error signal as an input for generating an output signal that will so actuate the actuator of said bypass valve as to open and close said valve as the error signal changes in proportion to the flow of air through said delivery duct means, means having said pressure difference signal by itself as an input signal and an output signal summed with said controller output signal to thereby provide an earlier transmission of the controller output to the bypass valve actuator in response to changes in the flow of load compressor discharge air through said delivery duct means.

2. A gas turbine engine power plant as defined in claim 1 wherein the means for converting the pressure difference signal to the surge protection signal comprises a function generator for solving the equation $$\frac{\Delta P}{P_E + P_{AMB}}$$

where:
$\Delta P$ is the pressure difference signal,
$P_E$ is the nozzle exit pressure, and
$P_{AMB}$ is the ambient pressure.

3. A gas turbine engine power plant as defined in claim 1 which also includes means for so scheduling the flow of fuel to said turbine engine combustor as to: maintain the turbine exhaust temperature below selected maximums during start-up acceleration of said gas turbine engine to a specified speed and to thereafter keep the gas turbine engine speed from exceeding a selected maximum.

4. A gas turbine engine power plant as defined in claim 3 wherein said fuel flow scheduling means includes means which is effective when the engine reaches a selected speed to switch the functioning of the scheduling means from the turbine exhaust gas temperature input mode of operation to the engine speed input mode of operation.

5. A gas turbine engine power plant as defined in claim 4 which includes a modulating type fuel flow control valve and wherein the means for switching the functioning of the fuel flow scheduling means as aforesaid comprises a first gating means for transmitting a first, exhaust gas temperature responsive signal to the actuator of said fuel flow control valve, a second gating means for transmitting a second, turbine speed responsive signal to said actuator, and means operable when the engine reaches said selected speed to inactivate the first and activate the second of said gating means.

6. A gas turbine engine power plant as defined in claim 3 wherein the fuel flow scheduling means comprises a speed responsive means operable during the start-up acceleration of said gas turbine engine to said rated speed for limiting the flow of fuel to said combustor and thereby limiting a runaway in the event of a failure which renders said fuel flow scheduling means incapable of operating as aforesaid in response to measured turbine exhaust gas temperature.

7. A gas turbine engine power plant as defined in claim 6 wherein the fuel flow scheduling means comprises means for adjusting the maximum flow of fuel as limited by said speed responsive means to compensate for changes in the ambient temperature and pressure at the power head compressor inlet.

8. A gas turbine engine power plant as defined in claim 3 wherein the fuel flow scheduling means includes means for limiting the minimum and maximum flows of fuel to said combustor as functions of the ambient temperature and pressure at the power head compressor inlet.

9. A gas turbine engine power plant as defined in claim 3 which includes a modulating-type fuel flow control valve and wherein the means for so scheduling the flow of fuel to said turbine engine combustor as to maintain the turbine exhaust gas temperature below said selected maximums comprises means for summing and providing a flow correction signal from a first signal indicative of measured turbine exhaust gas temperature and a second signal indicative of an exhaust gas setpoint temperature and means for establishing corrected minimum and maximum limits of the control signal for the actuator of said fuel flow control valve.

10. A gas turbine engine power plant as defined in claim 9 which includes means for providing to said summing means a second signal as aforesaid which is a function of gas turbine engine speed.

11. A gas turbine engine power plant as defined in claim 3 which includes a modulating-type fuel flow control valve and wherein the means for so scheduling the flow of fuel to said combustor as to maintain the speed of the power head turbine below the selected maximum comprises means for summing and providing a flow correction signal from a first signal indicative of measured turbine speed and a second signal indicative of setpoint turbine speed and means for converting the flow correction signal to a control signal for the actuator of said fuel flow control valve.

* * * * *